J. C. COLE.
METAL RIM FOR VEHICLE TIRES.
APPLICATION FILED NOV. 18, 1910.
987,216.
Patented Mar. 21, 1911.
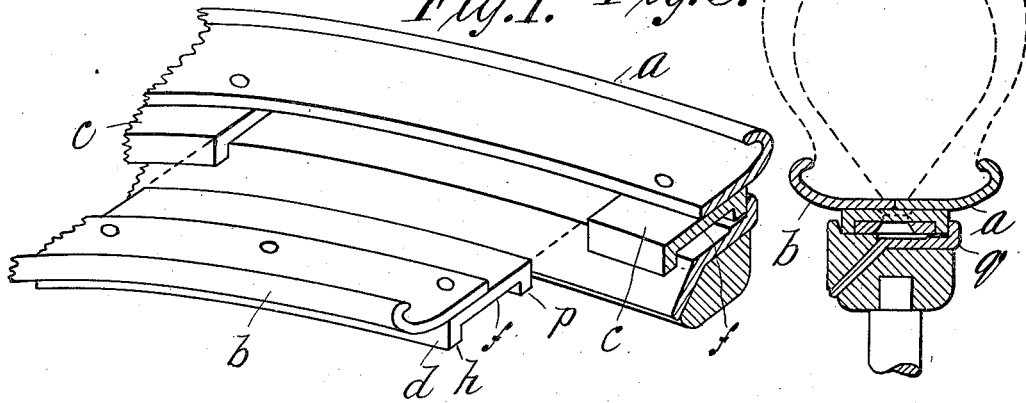
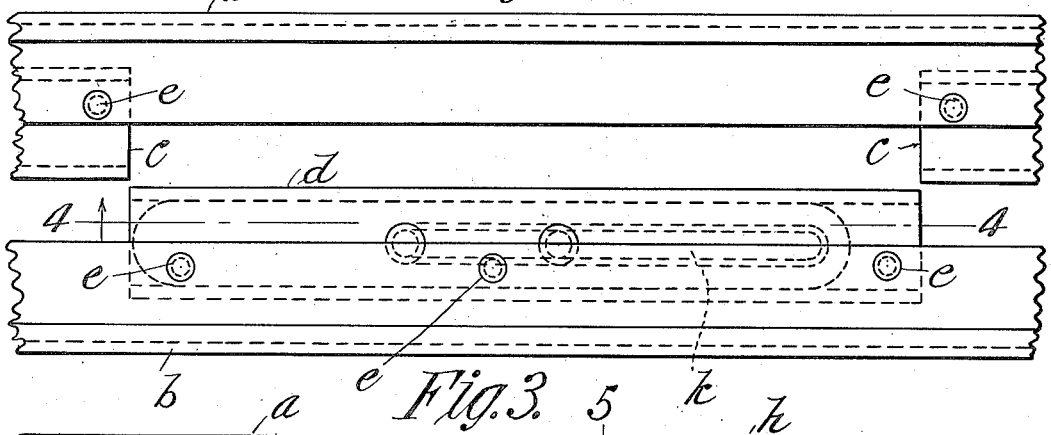
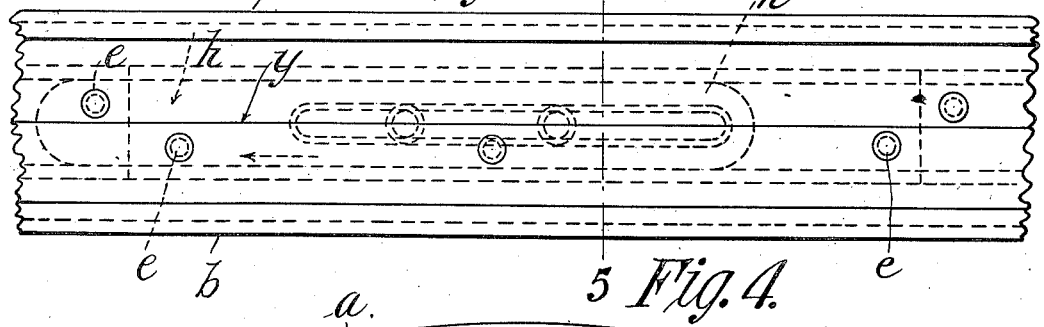
WITNESSES:
H. L. Sprague
Harry M. Bowen
INVENTOR,
John C. Cole,
BY
Chapin Lee
ATTORNEY.

UNITED STATES PATENT OFFICE.

JOHN CLARENCE COLE, OF CHICOPEE FALLS, MASSACHUSETTS, ASSIGNOR TO THE FISK RUBBER COMPANY, OF CHICOPEE FALLS, MASSACHUSETTS, A CORPORATION OF DELAWARE.

METAL RIM FOR VEHICLE-TIRES.

987,216.  Specification of Letters Patent.  Patented Mar. 21, 1911.

Application filed November 18, 1910. Serial No. 592,996.

*To all whom it may concern:*

Be it known that I, JOHN C. COLE, a citizen of the United States of America, residing at Chicopee Falls, in the county of Hampden and State of Massachusetts, have invented new and useful Improvements in Metal Rims for Vehicle-Tires, of which the following is a specification.

This invention relates to metal rims for vehicle tires and particularly to what is known as demountable rims such as are largely used on the wheels of self-propelled road vehicles, the object of the invention being to provide an improved construction of rim of the type referred to adapted to have tires of the clencher or of the Dunlop type,—so called,—mounted thereon, whereby the application of the tire to the rim and its removal therefrom are greatly facilitated.

The invention consists of a metal rim circumferentially divided to constitute two annular inter-engaging parts, together with locking devices permanently secured to the rim to secure the two parts of the latter together in a way which permits the easy separation of the two parts, each of said parts having means thereon to engage one edge of the clencher bead on the base of the tire. Broadly, the circumferentially divided rim for tires of this type is not new and is not claimed herein.

The invention is clearly illustrated in the accompanying drawings, in which,—

Figure 1 is a perspective view of a portion of the rim showing the two parts thereof in separated relation, one of said parts being in position on the fixed rim of a wheel, the locking devices not being visible in this view. Fig. 2 is a plan view of the rim parts in substantially the same relation as shown in Fig. 1, the locking devices being shown in dotted lines. Fig. 3 is also a plan view but shows the two parts of the rim in interengaging position and locked together. Fig. 4 is a sectional view of the parts shown in Fig. 2, the plane of the section lying about on the line 4—4, Fig. 2. This view shows one of the rims in full lines, the other being in section, as is also the locking bolt. This figure is on one-half the scale of Figs. 2 and 3. Fig. 5 is a cross sectional view taken on the line 5—5, Fig. 3 showing the rim in use as a demountable rim and mounted on a wheel. This view is also on a reduced scale.

Referring to the drawings, $a$ indicates one of the two parts of the circumferentially divided rim, and $b$ the other. The outer edge of each of these parts is rolled upward and more or less turned in on itself, like any clencher rim, to engage the clencher bead on the opposite sides of the base of the tire. On the under side of each of the annular parts $a$ and $b$ are secured the channeled, separated strips, indicated by $c$ on the rim part $a$, and by $d$ on the rim part $b$; these strips being so positioned that when the two parts $a$ and $b$ of the rim are brought together, as shown in Fig. 3, the strips $c$ and $d$ will constitute one continuous channeled strip around the inner periphery of the rim, the channeled portion of one of said strips registering with those contiguous thereto. These channeled strips are applied to the rim portions $a$ and $b$ by riveting, as shown, said rivets being indicated by $e$, and are so applied that the longitudinal central line of the channels $f$ which are formed in the under side of the strips $c$ and $d$, will fall on the circumferential divisional line $g$ of the rim, as shown in Fig. 3.

Located in certain of the channeled strips is a locking bolt $h$ bent, of course, to conform to the surface of the channel strip in which it is located and having an easy sliding fit in said strip, this bolt being provided with a long slot $k$, as shown, running longitudinally thereof and through which extend two rivets $m$, $m$, which serve to hold the bolt in position in said channeled strips; and to this end said slot $k$ is preferably made with outwardly beveled sides, as shown in Fig. 5, the rivets $m$ being similarly beveled, as shown in Figs. 4 and 5. The rivets $m$ extend through and are riveted in the channeled strip and the sliding bolts are thus permanently attached to said strips and lie entirely within the channels $f$, whereby when the rim, as shown in Fig. 5, is applied to the wheel, the outer surface of the bolt $h$ will be flush with the borders $p$ of the channels. The object of so locating these locking bolts within the channels $f$ is to permit the two parts $a$ and $b$ of the rim to be brought together in engagement with the beads on the base of the tire and then locked together by circumferentially sliding the bolts $h$ in certain of the channeled strips into the channel of the strip contiguous to one end thereof on the other part of the rim thus providing several independent locking devices for the rim parts a and b, which, when the wheel is in use, will be protected as much as possible from the mud and grit.

The provision of a plurality of locking devices for the two parts of the rim adds greatly to the security thereof for by thus distributing the locking devices, if one should by chance work out of its engagement with the strip contiguous thereto those remaining in engagement would securely lock the rim parts together. Furthermore, by making the locking bolts comparatively short it is much easier to slide them, and this is a great advantage as compared to a locking device which is in one piece which encircles the wheel; for, as is well known, water and grit will work in between the demountable rim and the fixed rim indicated by q, Fig. 5, on which it is secured, and this operates to make any movable locking device work very hard.

What I claim, is:—

1. A demountable rim for vehicle tires of the type specified comprising two annular parts each having a rolled up edge to engage the bead on the base of the tire, each of said annular rim parts having projections thereon extending toward the opposite part, a projection on one of said parts fitting between two of the projections on the opposite part, separate, independently operable, locking devices permanently mounted on certain of said projections and movable circumferentially of the rim into locking engagement with a contiguous projection on the other rim part, whereby the two rim parts may be locked together.

2. A demountable rim for vehicle tires of the type specified comprising two annular parts each having a rolled up edge to engage the bead on the base of the tire, each of said annular rim parts having projections thereon extending toward the opposite part, a projection on one of said parts fitting between two of the projections on the opposite part, there being a channel in said projections lengthwise thereof, separate, independently operable, locking devices permanently mounted on certain of said projections in the channels therein and movable circumferentially of the rim into the channel, of a projection on the opposite rim part, whereby the two rim-parts may be locked together.

JOHN CLARENCE COLE.

Witnesses:
K. I. CLEMONS,
WM. H. CHAPIN.